US012646419B2

(12) United States Patent 
Karri et al.

(10) Patent No.: US 12,646,419 B2 
(45) Date of Patent: Jun. 2, 2026

(54) ASSEMBLY AND DISASSEMBLY VALIDATION OF MACHINED COMPONENTS

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Partho Ghosh, Kolkata (IN); Bishnubrata Panigrahi, Vizag (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 866 days.

(21) Appl. No.: 17/447,964

(22) Filed: Sep. 17, 2021

(65) Prior Publication Data

US 2023/0089436 A1 Mar. 23, 2023

(51) Int. Cl.
*G09B 19/00* (2006.01)
*G06Q 50/04* (2012.01)
*G06V 20/20* (2022.01)
*G06T 19/00* (2011.01)

(52) U.S. Cl.
CPC ........... *G09B 19/003* (2013.01); *G06Q 50/04* (2013.01); *G06V 20/20* (2022.01); *G06T 19/006* (2013.01)

(58) Field of Classification Search
CPC ....... G09B 19/003; G06V 20/20; G06Q 50/04
See application file for complete search history.

(56) References Cited

U.S. PATENT DOCUMENTS

| | | | | |
|---|---|---|---|---|
| 9,483,959 B2 * | 11/2016 | Wallace | ................... | G09B 9/00 |
| 9,936,902 B2 | 4/2018 | Bhushan | | |
| 10,481,579 B1 * | 11/2019 | Putman | .............. | G06Q 10/0639 |

(Continued)

FOREIGN PATENT DOCUMENTS

WO 2020227429 A1 11/2020

OTHER PUBLICATIONS

Disclosed Anonomously, "Fastening System, Primarily for Two or More Batteries", IP.COM000240902D, Mar. 11, 2015, pp. 1-6.

(Continued)

*Primary Examiner* — Dmitry Suhol
*Assistant Examiner* — Alyssa N Brandley
(74) *Attorney, Agent, or Firm* — Tihon Poltavets

(57) ABSTRACT

A method for validating proper installation and removal of machine components during an assembly or a disassembly process includes identifying a current step in an assembly or disassembly process. The method further includes displaying appropriate positioning and alignment for at least one individual part and at least one tool for the current step in the assembly or the disassembly process. The method further includes monitoring a plurality of actions of a user while performing the current step in the assembly or the disassembly process. The method further includes, responsive to determining a corrective action is required for the current step, determining a recommendation based on the corrective action, the at least one individual part, and the at least one tool. The method further includes displaying the recommendation in an augmented device associated with the user.

20 Claims, 6 Drawing Sheets

(56)  References Cited

U.S. PATENT DOCUMENTS

| | | | | |
|---|---|---|---|---|
| 10,915,928 | B2* | 2/2021 | Rakshit | G06V 20/10 |
| 2009/0198365 | A1* | 8/2009 | Seaman | G05B 19/41805 |
| | | | | 700/116 |
| 2013/0137468 | A1* | 5/2013 | Kahle | G01C 15/00 |
| | | | | 455/457 |
| 2015/0243013 | A1* | 8/2015 | White | G06F 3/0304 |
| | | | | 382/103 |
| 2016/0130018 | A1* | 5/2016 | Subramanyam | G06F 3/147 |
| | | | | 701/33.2 |
| 2016/0171903 | A1* | 6/2016 | Grossman | G06T 19/006 |
| | | | | 434/238 |
| 2016/0314704 | A1* | 10/2016 | Bell | G06Q 50/01 |
| 2017/0352282 | A1* | 12/2017 | Anderson | G06T 7/70 |
| 2018/0107191 | A1* | 4/2018 | Kubat | G05B 19/4186 |
| 2019/0035305 | A1* | 1/2019 | Robertson | G06F 1/163 |
| 2019/0227528 | A1* | 7/2019 | Abbott | G05B 13/0265 |
| 2019/0266804 | A1* | 8/2019 | Kohlhoff | G06T 13/20 |
| 2020/0057432 | A1* | 2/2020 | Yu | G05B 19/4188 |
| 2020/0113258 | A1 | 4/2020 | Guenther | |
| 2020/0320640 | A1 | 10/2020 | Amigo | |

OTHER PUBLICATIONS

Mell et al., "The NIST Definition of Cloud Computing", National Institute of Standards and Technology, Special Publication 800-145, Sep. 2011, pp. 1-7.

* cited by examiner

100

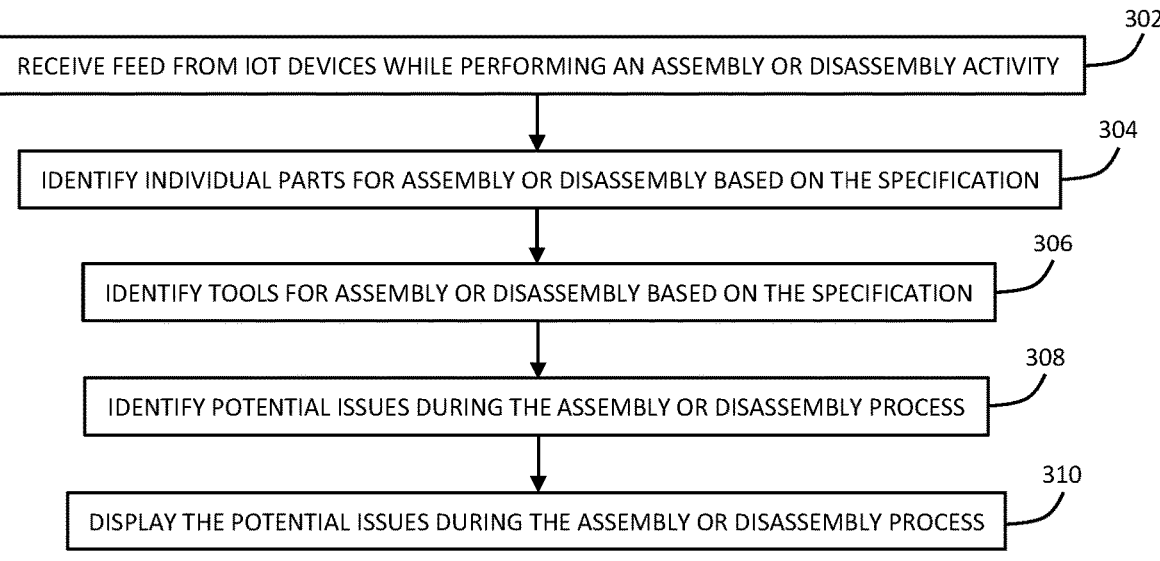

302
RECEIVE FEED FROM IOT DEVICES WHILE PERFORMING AN ASSEMBLY OR DISASSEMBLY ACTIVITY

304
IDENTIFY INDIVIDUAL PARTS FOR ASSEMBLY OR DISASSEMBLY BASED ON THE SPECIFICATION

306
IDENTIFY TOOLS FOR ASSEMBLY OR DISASSEMBLY BASED ON THE SPECIFICATION

308
IDENTIFY POTENTIAL ISSUES DURING THE ASSEMBLY OR DISASSEMBLY PROCESS

310
DISPLAY THE POTENTIAL ISSUES DURING THE ASSEMBLY OR DISASSEMBLY PROCESS

FIG. 3A

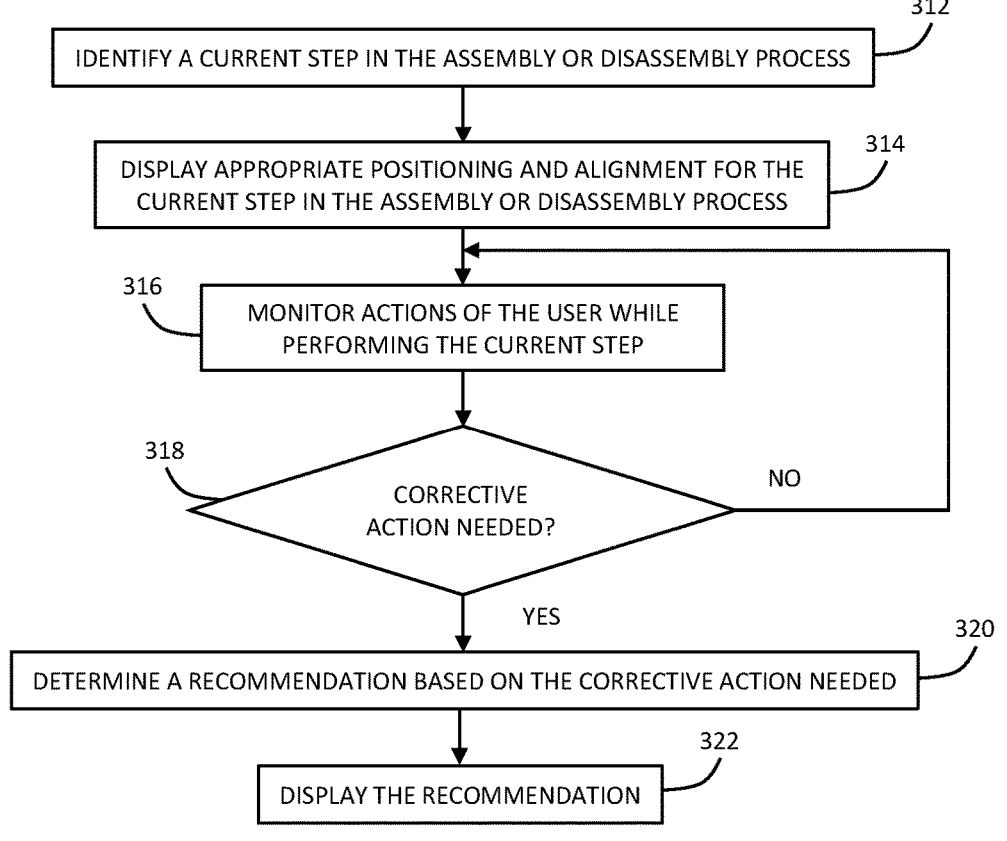

312
IDENTIFY A CURRENT STEP IN THE ASSEMBLY OR DISASSEMBLY PROCESS

314
DISPLAY APPROPRIATE POSITIONING AND ALIGNMENT FOR THE CURRENT STEP IN THE ASSEMBLY OR DISASSEMBLY PROCESS

316
MONITOR ACTIONS OF THE USER WHILE PERFORMING THE CURRENT STEP

318
CORRECTIVE ACTION NEEDED?

NO

YES

320
DETERMINE A RECOMMENDATION BASED ON THE CORRECTIVE ACTION NEEDED

322
DISPLAY THE RECOMMENDATION

FIG. 3B

ASSEMBLY AND DISASSEMBLY VALIDATION OF MACHINED COMPONENTS

BACKGROUND

This disclosure relates generally to assembly and disassembly processes, and in particular to validating proper installation and removal of machined components during an assembly or disassembly process.

In a typical manufacturing setting, various machine components can be assembled to create a final product and the final product can be disassembled down to the various machine components for repurposing in other products. The assembly or disassembly of the final product includes fastening and unfastening bolts, clamping, drilling, and a number of other actions to ensure the final product is assembled or disassembled properly. During an assembly process, an assembler can be required to apply an appropriate torque or perform a variety of torquing procedures to ensure each bolt is properly secured to specification in the final product. For example, stretch bolts require a specific torquing process of applying a specific torque to the bolt and subsequently performing one or more additional turns at varying degrees.

SUMMARY

Embodiments in accordance with the present invention disclose a method, computer program product and computer system for validating proper installation and removal of machine components during an assembly or a disassembly process, the method, computer program product and computer system can identify a current step in an assembly or disassembly process of a product. The method, computer program product and computer system can display appropriate positioning and alignment for at least one individual part and at least one tool for the current step in the assembly or the disassembly process. The method, computer program product and computer system can monitor one or more actions of a user while performing the current step in the assembly or the disassembly process of the product. The method, computer program product and computer system can, responsive to determining a corrective action is required for the current step, determine a recommendation based on the corrective action, the at least one individual part, and the at least one tool. The method, computer program product and computer system can display the recommendation to the user.

BRIEF DESCRIPTION OF THE SEVERAL VIEWS OF THE DRAWINGS

FIG. 3A depicts a flowchart for an assembly validation program providing a user with potential issues during an assembly or disassembly process, in accordance with an embodiment of the present invention.

FIG. 3B depicts a flowchart for an assembly validation program monitoring actions of the user during an assembly or disassembly process, in accordance with an embodiment of the present invention.

DETAILED DESCRIPTION

Figure 1:
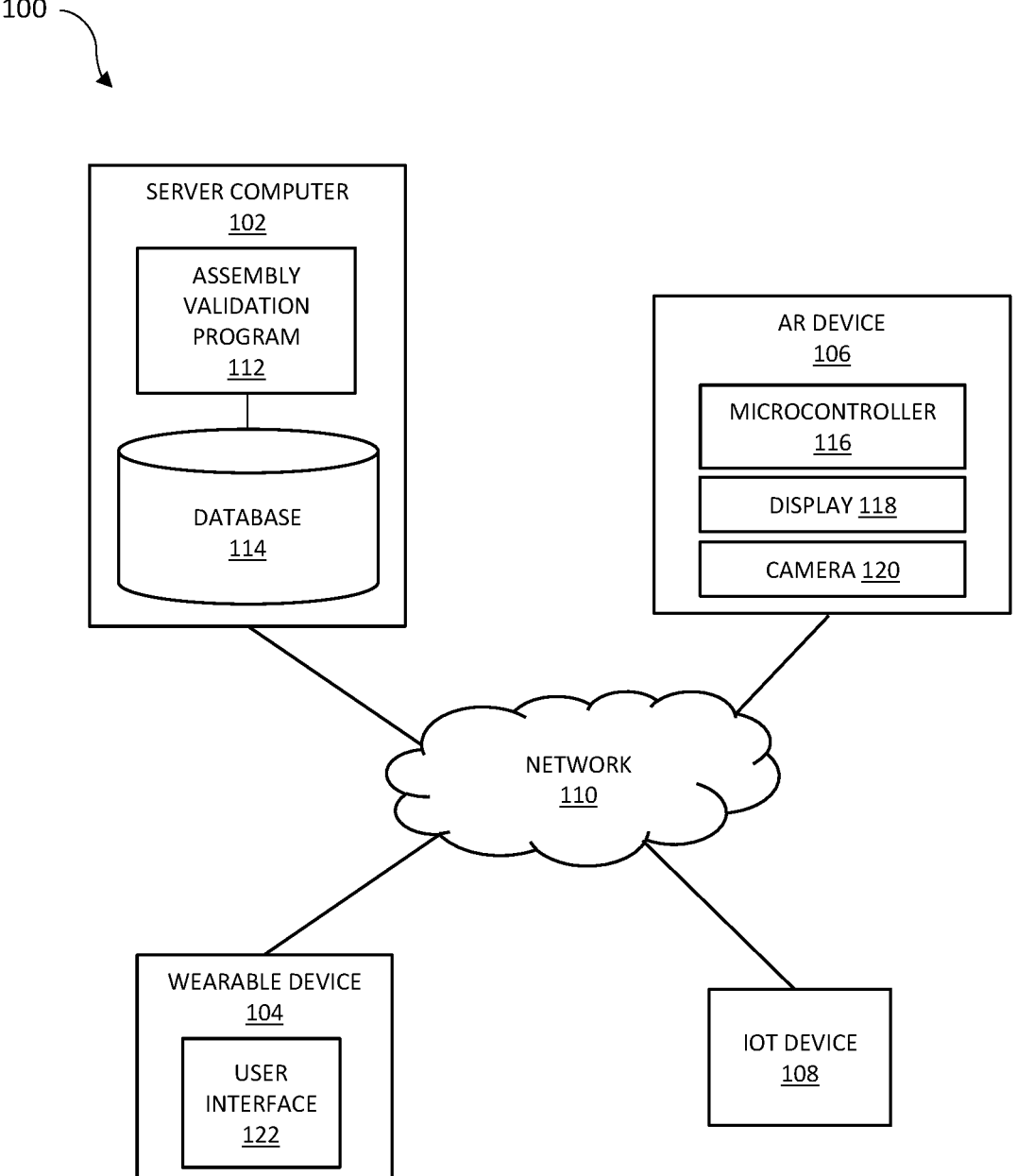
FIG. 1 is a functional block diagram illustrating a distributed data processing environment, in accordance with an embodiment of the present invention.

Embodiments of the present invention provide validation of proper installation and removal of machine components during an assembly or disassembly process by identifying if the fastening or unfastening is performed in a proper manner based on sensor feed gathered from one or more devices (e.g., a wearable device) associated with a user and alerting the user regarding the proper or improper fastening or unfastening operations. While performing any assembling or disassembling activity, a wearable device associated with the user receives an Internet of Things (IoT) device feed of each individual machine part and tool being utilized to fasten or unfasted the individual machine part. Based on the IoT device feed, embodiments of the present invention identify specification information for the individual machine parts (e.g., number of screw threads, thread type) for assembled or disassembled and identify one or more tools utilized during the assembled or disassembled. Subsequently, embodiments of the present invention identify if the worker has properly fastened or unfastened the machine parts as per the identified specification information.

Embodiments of the present invention incorporate a thread matching system during assembling or disassembling of machine parts to determine if there are any conditions leading to potential thread damage due to inaccurate and/or forceful fastening or unfastening. If there is a potential for thread damage, a notification is sent to the user with recommended steps (e.g., alter angle of fastening, alter a type of machine part, or re-thread a component accepting the machine part). An augmented reality (AR) device associated with the user can capture a feed of the fastening or unfastening operation to determine whether the machine parts thread matches with the component accepting the machine part and determine an appropriate recommendation. Embodiments of the present invention can display an augmented blueprint in the AR device depicting the appropriate positioning and angular alignment of the machine part on the assembling device.

Embodiments of the present invention compare an expected versus an actual speed of rotation and/or movement of the wearable device associated with the user during assembling or disassembling operation and determine if proper fastening or unfastening is being performed properly, an additional force is required, or a reduction in force is required. For example, during a fastening operation, a rotational speed of a machine part gradually decreases and during an unfastening operation, a rotational speed of the machine part gradually increases). A recommend regarding a force to be applied in synchronization to the torque, angular movement or placement, pre-existing machine conditions (e.g., rust, threat damage) during different stages of fastening are provided to the user via the one or more devices associated with the user, so that the user can visualize the fastening process and its metadata. During the fastening or unfastening operation, embodiments of the present invention can detect whether a machine part is faulty or a condition for potential machine part failure is present (e.g., bent bolt or cross-threading) and can alert the user to stop the fastening or unfastening process to prevent further damage. Based on a torque, an angular placement, and/or a force exerted on the machine component during fastening or unfastening, embodiments of the present invention determine whether the machine part has developed a brushing or slippage condition resulting in potential damage to the machine part, thereby alerting the user to cease the fastening or unfastening process to address the potential damage.

Based on a number of movements and types of movements detected by the wearable device associated with the user during fastening or unfastening operations, embodiments of the present invention determine if a specific fastening or unfastening process is complete. Embodiments of the present invention can compare a number of rotations or an angular degree of hand displacement during fastening or unfastening of the machine part with a specification for the machine part (e.g., a number of threads on a bolt), to predict if slippage is happening and recommending appropriate steps to the user. The wearable device can provide haptic, audio, and/or visual notifications to the user, so that the user can take corrective action for performing the fastening or unfastening in a proper manner in a real-time manner.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, wearable device 104, augmented reality (AR) device 106, and Internet of Things (IoT) device 108 all interconnected over network 110. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with wearable device 104, AR device 106, IoT device 108, and other computing devices (not shown) within the distributed data processing environment via network 110. In another embodiment, server computer 102 represents a computing system utilizing clustered computers and components (e.g., database server computers, application server computers, etc.) that act as a single pool of seamless resources when accessed within the distributed data processing environment. Server computer 102 includes assembly validation program 112 and database 114. Server computer 102 may include internal and external hardware components, as depicted and described in further detail with respect to FIG. 4.

Wearable device 104 represents a user wearable programmable electronic device capable of communicating with various components and devices within the distributed data processing environment (e.g., server computer 102, AR device 106, and IoT device 108), via network 110. Wearable device 104 is a miniature electronic device that may be worn by the bearer under, with, or on top of clothing, as well as in or connected to glasses, hats, or other accessories. In general, wearable device 104 represents one or more programmable electronic devices or combination of programmable electronic devices capable of executing machine readable program instructions and communicating with other computing devices (not shown) within the distributed data processing environment via a network, such as network 110. In one embodiment, wearable device 104 represents one or more devices (e.g., smartwatch) associated with a user. Wearable device 104 includes an instance of user interface 122 for interacting with assembly validation program 112 on server computer 102.

AR device 106 represents a user wearable augment reality device (e.g., electronic contact lens, wearable electronic headset) with integrated microcircuitry capable of displaying information to the user. AR device 106 includes microcontroller 116, display 118, and camera 120, where assembly validation program 112 can receive a video feed from camera 120 of a user performing a fastening or unfastening operation during an assembly or disassembly process. Microcontroller 116 can include a display control circuit for display 118, a communication and power conversion circuit for communicating via network 110 and managing an integrated power supply, and a sensor readout and control circuit for monitoring eye movement of the user wearing AR device 106. Display 118 allows for a user of AR device 106 to view various notifications and queries from assembly validation program 112. In an example where AR device 106 is an electronic contact lens, display 118 is a semitransparent display and microlens array integrated into AR device 106 for viewing content. AR device 106 can also include a power storage module, a solar cell module for charging the power storage module, a biosensor module for collecting data (e.g., tracking eye movement), and a communications and power module for communicating with server computer 102, wearable device 104, and IoT device 108 via network 110.

IoT device 108 represents an electronic device connected to network 110 capable of sending various information to assembly validation program 112. IoT device 108 represents any electronic device embedded with sensors and software for connecting and exchanging data with other devices and systems over the internet (e.g., network 110). In one example, IoT device 108 is a power tool (e.g., drill device, torque wrench device) with a wireless communication module capable of sending information to assembly validation program 112 that includes battery information, torque settings (e.g., 100 ft-lbs.), drive setting (e.g., clockwise, counterclockwise), type of fastening setting (e.g., drill, drive, impact), and any other information the power tool with the wireless communication module can send to assembly validation program 112 via network 110.

Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server computer 102, wearable device 104, AR device 106, IoT device 108, and other computing devices (not shown) within the distributed data processing environment.

Assembly validation program 112 validates proper fastening and unfastening of components during an assembly or disassembly process. Assembly validation program 112 receives a feed from AR device 106 while preforming an assembly or disassembly process, where the feed can include a video of a fastening or unfastening operation being performed by the user. Assembly validation program 112 can identify individual parts (e.g., bolts, screws, clamps) for assembly or disassembly based on the specification and can identify one or more tools for assembly or disassembly of the identified individual part based on the specification. Assembly validation program 112 can identify potential issues during the assembly or disassembly process based on specification information and information received from IoT device 108. Assembly validation program 112 can monitor actions of the user during an assembly or disassembly process based on information received from IoT device 108 to ensure the actions of the user are being performed according to specification.

Assembly validation program 112 can identify a current step in the assembly or disassembly process and display an appropriate positioning and alignment for a fastening or unfastening operation in the current step in the assembly or disassembly process. Assembly validation program 112 can monitor actions of the user while the user performs the fastening or unfastening during the current step and determine whether corrective action is needed. In the event assembly validation program 112 determines that a corrective action is not needed, assembly validation program 112 can revert to monitoring actions of the user while preforming the current step. In the event assembly validation program 112 determines that corrective action is needed, assembly validation program 112 can determine a recommendation based on the corrective action needed and display the recommendation to the user in user interface 122 on wearable device 104 or in display 118 of AR device 106.

Database 114 stores various data utilized by assembly validation program 112 including specification information for individual parts and tools for fastening and unfastening each of the individual parts. In the depicted embodiment, database 114 resides on server computer 102. In another embodiment, database 114 may reside on wearable device 104 or elsewhere within the distributed data processing environment provided assembly validation program 112 has access to database 114. A database is an organized collection of data, where database 114 can be implemented with any type of storage device capable of storing data and configuration files that can be accessed and utilized by assembly validation program 112, such as a database server, a hard disk drive, or a flash memory.

User interface 122 enables a user to make requests of or issue commands to server computer 102, wearable device 104, AR device 106, and IoT device 108 via network 110. User interface 122 also enables the user to receive information and instructions on wearable device 104 via network 110. In one embodiment, user interface 122 may be a graphical user interface (GUI) or a web user interface (WUI) and can display text, documents, web browser windows, user options, application interfaces, and instructions for operation, and include the information (such as graphic, text, and sound) that a program (e.g., assembly validation program 112) presents to a user and the control sequences the user employs to control the program. User interface 122 enables a user of wearable device 104 to interact with assembly validation program 112 operating on server computer 102.

Figure 2A:
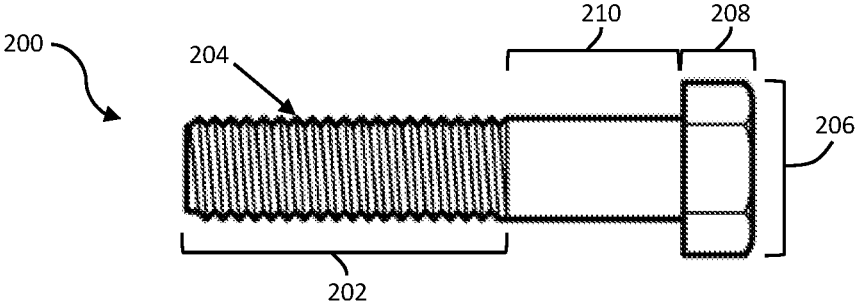
FIG. 2A illustrates a side view of a hex bolt, in accordance with an embodiment of the present invention.

FIG. 2A illustrates a side view of a hex bolt, in accordance with an embodiment of the present invention. In the illustrated embodiment, machine component 200 is a hex bolt for fastening or unfastening during an assembly or disassembly process of a product. Machine component 200 includes threaded portion 202 with threads 204 which requiring a specific torquing procedure to ensure a proper fastening. Threads 204 allow for a maximum of 20 rotations to fasten machine component 200 to a mounting surface of the product. Machine component 200 further includes non-threaded portion 210 with hex top 206 and hex length 208, where hex top 206 and hex length 208 accept a 10 mm socket or wrench for fastening and unfastening machine component 200 to the mounting surface of the product. Assembly validation program 112 has the ability to determine based on a specification for machine component 202 that a 10 mm socket is best utilized to apply a torque to the bolt versus a 10 mm wrench, since the 10 mm wrench may slip off the hex top resulting in injury or damage to surrounding componentry on the mounting surface of the product.

Figure 2B:
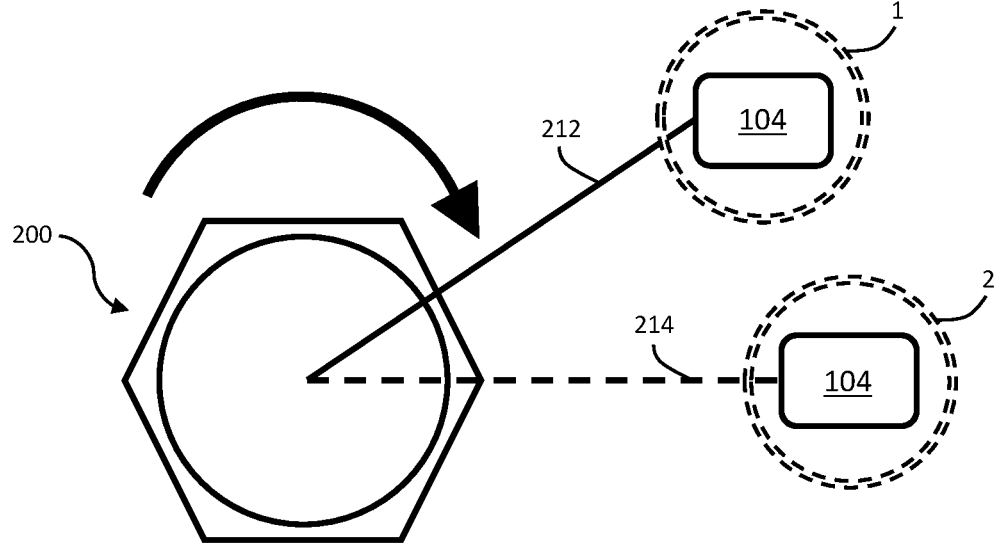
FIG. 2B illustrates a top view of a hex bolt being torqued with a wrench by a user with a wearable device, in accordance with an embodiment of the present invention.

FIG. 2B illustrates a top view of a hex bolt being torqued with a wrench by a user with a wearable device, in accordance with an embodiment of the present invention. In the illustrated embodiment, a user with wearable device 104 is applying a torque to machine component 200 (i.e., hex bolt) utilizing a torque wrench with socket combination. Assembly validation program 112 can monitor a progress of the torquing procedure based on a movement of wearable device 104 associated with the user. For example, if the torquing procedures requires machine component 200 be torqued to 100 ft-lbs. and subsequently turned 45 degrees, assembly validation program 112 can monitor the progress of the 45 degrees via wearable device 104 to ensure the user does not overlook the subsequent turn to complete the torquing procedure. Since a torque wrench with socket combination is being utilized to fasten machine component 200, wearable device 104 located on a wrist of the user positioned distance 212 from a center point of machine component 200 at position 1. Assembly validation program 112 has the ability to determine that a mechanism of the torque wrench was activated once machine component 200 has reached the proper torqued specification of 100 ft-lbs., since the mechanism in the torque wrench creates a sharp jolt once the proper torque is reached. The sharp jolt of the torque wrench is capturable by wearable device 104 associated with the user and assembly validation program 112 receives that capturable information from wearable device 104. Based on a position of wearable device 104 where the sharp jolt occurred, assembly validation program 112 can monitor a further progress of wearable device 104 during the additional 45 degree turn to ensure that proper torquing specifications for machine component 200 are met. Assembly validation program 112 determines the additional 45 degree turn of machine component 200 is complete when wearable device 104 is positioned at distance 214 from the center point of machine component 200 at position 2.

Figure 2C:
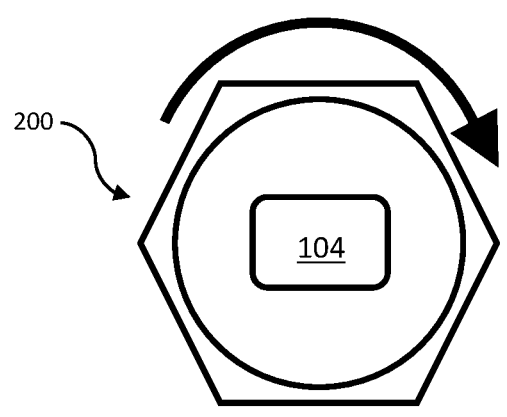
FIG. 2C illustrates a top view of a hex bolt being torqued with a socket by a user with a wearable device, in accordance with an embodiment of the present invention.

FIG. 2C illustrates a top view of a hex bolt being torqued with a socket by a user with a wearable device, in accordance with an embodiment of the present invention. In the illustrated embodiment, a user with wearable device 104 is applying a torque to machine component 200 (i.e., hex bolt)

utilizing only a socket hand tool without the required torque wrench that is required by the specification. As discussed above, assembly validation program 112 can monitor a progress of the torquing procedure based on a movement of wearable device 104 associated with the user. Assembly validation program 112 determines a position of wearable device 104 over a center point of machine component 200 as wearable device 104 rotates in a clockwise motion rather than at a distance (i.e., distance 212 and 214) from the center point of machine component 200. Assembly validation program 112 determines machine component 200 is being improperly fastened by the user and a corrective action by the user is needed, since the current procedure being utilized by the user can result in improper fastening of machine component 200 to a mounting surface of a product. Assembly validation program 112 display the corrective action to the user, which includes the proper torquing procedures from the specification associated with machine component 200 and tool (i.e., torque wrench) required to perform the proper torquing procedure per the specification.

FIG. 3A depicts a flowchart for an assembly validation program providing a user with potential issues during an assembly or disassembly process, in accordance with an embodiment of the present invention.

Assembly validation program 112 receives a feed from IoT device while preforming an assembly or disassembly process (302). In this embodiment, assembly validation program 112 receives a feed of information from the IoT device while a user is performing an assembly or disassembly process, where assembly validation program 112 utilizes the feed of information to identify a product being assembled or disassembled. In one example, assembly validation program 112 receives a scan of an identification QR code on the product, where the product is being disassembled to salvage various components (e.g., circuitry components, hardware components) for repurposing in future products. The identification QR code allows for assembly validation program 112 to identify the product being disassembled and subsequently, identify individual parts and tools required for proper disassembly to avoid damaging any salvageable components. In another example, assembly validation program 112 receives a scan of an identification QR code on a product label of an initial component, where the initial component is a starting point for a product being assembled by a user. The identification QR code allows for assembly validation program 112 to identify the product being assembled and subsequently, identify individual parts and tools required for proper assembly of the product from the initial component.

In yet another example, assembly validation program 112 receives a feed of information from an IoT device performing an assembly or disassembly process (e.g., drill device, torque wrench device). As the user initializes an assembly or disassembly process, assembly validation program 112 receives the feed of information from the IoT device and compares one or more actions performed by the IoT device (e.g., 25 counterclockwise rotations of a drill device) to one or more actions detailed in a specification of a product stored in a database. Assembly validation program 112 can match the one or more actions performed by the IoT device to the one or more actions detailed in the specification of the product to identify an assembly or disassembly process being performed on the product. In another embodiment, assembly validation program 112 can receive a video feed from a camera on an augmented reality device associated with the user, where assembly validation program 112 utilizes the video feed to identify a product and determine whether the product is being assembled or disassembled. Based on the received feed of information from the IoT device, assembly validation program 112 identifies a product and determines whether the product is being assembled or disassembled.

Assembly validation program 112 identifies individual parts for assembly or disassembly based on the specification (304). Based on the received feed of information from the IoT device, assembly validation program 112 identifies the individual parts for assembly or disassembly based on the specification for the identified product. In one example, assembly validation program 112 identifies a product (e.g., server rack) is being assembled for shipment to a customer and identifies the individual parts for the assembly and subassembly of the product based on the specification for the product. The individual parts include various machine components for fastening and/or securing of one or more items on the product. In another example, assembly validation program 112 identifies a product is being disassembled for salvaging and recycling of various components and identifies individual parts for disassembly of the product based on the specification for the product. The individual parts include various machine components for unfastening and/or removal of one or more items on the product. In addition to identifying individual parts for assembly or disassembly based on the specification of the product, assembly validation program 112 has the ability to identify specification information for each of the individual parts based on a part number for each of the individual part. Assembly validation program 112 has the ability to query a database for the specification for each of the individual parts or query a web-based search tool to identify specification information for each of the individual parts based on the part number. Since certain individual parts include fastening instructions that are not opposite to unfastening instructions, assembly validation program 112 identifies the specification for each of the individual parts to identify proper fastening and unfastening procedures. A rivet is an example of an individual part that includes fastening instruction that are not opposite to the unfastening instructions, where a rivet tool is utilized to fasten the rivet during assembly and a drill is utilized to unfasten the rivet during disassembly.

Assembly validation program 112 identifies tools for assembly or disassembly based on the specification (306). Based on the specification for the product, assembly validation program 112 identifies the tools for assembly or disassembly based on the specification of the product and in some embodiments, also based on the specification of each individual part. For an assembly process, assembly validation program 112 identifies tools for the assembly based on the specification of the product, where the specification includes a list of the tools required for the assembly. For a disassembly process, assembly validation program 112 identifies tools for the assembly based on the specification of the product and the specification of each individual part. If a tool required for an individual part during the disassembly process is different between the specification of the product and the specification of the individual part, the tool identified in the specification of the individual part supersedes the tool identified in the specification for the individual part. As mentioned in the example above, a rivet requires a rivet tool for assembly as specified in the specification of the product, but the rivet requires a drill for disassembly as specified in the specification of the individual part (i.e., the rivet). As a result, assembly validation program 112 identifies the drill as the tool required for the disassembly process. In another example, for a hex bolt, a 10 mm socket with torque wrench is required for assembly as specified in the specification for the product and a 10 mm socket with breaker bar is required for disassembly as specified in the specification of the individual part (i.e., hex bolt). As a result, assembly validation program 112 identifies the 10 mm socket with breaker bar as the tools required for the disassembly process.

Assembly validation program 112 identifies potential issues during the assembly or disassembly process (310). For an assembly process, assembly validation program 112 identifies potential issues by parsing through the specification for the product being assembled and identifying manufacturer warnings provided in the specification. Each warning provided in the specification for the product is a potential issue the user can encounter during the assembly process. Assembly validation program 112 can also identify general potential issues during the assembly process including utilizing an appropriate tool (e.g., 10 mm wrench versus 10 mm socket for a hex bolt) to avoid potential damage or injury if the tool is incorrect or improperly seated during a fastening operation. Assembly validation program 112 can also identify potential damaging causing situation, such as, a cross threading event between a bolt a mounting surface on the product when the bolt is improperly inserted into a receiving end on the mounting surface. For a disassembly process, assembly validation program 112 identifies potential issues by parsing through the specification for the product and the specification for each of the individual parts and identifying manufacturer warning provided in the specifications. Each warning provided in the specification for the product and the specification for each individual part is a potential issue the user can encounter during the disassembly process. For example, a removal of a rivet with a drill can result in damage to a surround area or injury if the procedure is performed improperly. Assembly validation program 112 can identify the proper procedure for removing the rivet based on specification information for the rivet (i.e., individual part) and mark the procedure as a potential issue during the disassembly process.

Assembly validation program 112 displays the potential issues during the assembly or disassembly process (312). In one embodiment, assembly validation program 112 displays the potential issues during the assembly or disassembly process in a list viewable by user on a wearable device, an IoT device, and/or an augmented reality device associated with the user. Assembly validation program 112 displays the lists, along with an associated step in the assembly or disassembly process. In another embodiment, assembly validation program 112 identifies a current step in the assembly or disassembly process (discussed in further detail with regards to FIG. 3B) and displays a potential issue for each specific step being performed during the assembly or disassembly process. Assembly validation program 112 identifies the current step in the assembly or disassembly process based on information received from a wearable device, an IoT device, and/or an augmented reality device associated with the user.

FIG. 3B depicts a flowchart for an assembly validation program monitoring actions of the user during an assembly or disassembly process, in accordance with an embodiment of the present invention. Assembly validation program 112 identifies a current step in the assembly or disassembly process (312). As mentioned above with regards to FIG. 3A, assembly validation program 112 can identify the current step in the assembly or disassembly process based on information received from a wearable device, an IoT device, and/or an augmented reality device associated with the user. Alternatively, assembly validation program 112 can query the user to select the current step in the assembly or disassembly process via one or more of a wearable device, an IoT device, and/or an augmented reality device associated with the user. For a wearable device being worn on a wrist of a user, assembly validation program 112 identifies a current step in the assembly or disassembly process based on a pattern of hand motions being performed by the user. In one embodiment, assembly validation program 112 utilizes iterative machine learning to monitor various motions of a wearable device as a specific product (e.g., server rack) is assembled or disassembled multiple times (e.g., 10 times) and based on the iterative learning, assembly validation program 112 determines a set of motions of the wearable device for assembly or disassembly of the specific product. The set of motions of the wearable device represent how the wearable device moves during the fastening and unfastening of machine parts as the specific product is being assembled or disassembled, as captured by an accelerometer integrated into the wearable device. Examples of the movements for a set of motions for a specific product are shown in FIGS. 2B and 2C. In another embodiment, assembly validation program 112 utilizes a library of specific products, where each specific product includes a set of motions for assembling the specific product and a set of motions for disassembling the specific product.

For an IoT device (e.g., torque wrench device), assembly validation program 112 identifies a current step in the assembly or disassembly process based on a pattern of activation events and alteration in settings being performed by the user. In one embodiment, assembly validation program 112 utilizes iterative machine learning to monitor the activation events and alteration in settings for the IoT device as a specific product (e.g., server rack) is assembled or disassembled multiple times (e.g., 10 times) and based on the iterative learning, assembly validation program 112 determines a set of activation events and alteration in settings for the IoT device being utilized for assembly or disassembly of the specific product. The set of activation events and alteration in settings for the of the IoT device represent how the IoT device is utilized during the fastening and unfastening of machine parts as the specific product is being assembled or disassembled. For example, a first step of an assembly process can include a drill device being set to the highest torque setting and rotating 25 times to secure a bolt and a second step of an assembly process can include a torquing device being set to 100 ft-lbs. and reaching the set 100 ft-lbs. to secure the bolt. Assembly validation program 112 stores the first step of a set of activation events and alteration in settings for a first IoT device (i.e., drill device) and stores the second step of set of activation events and alteration in settings for a second IoT device (i.e., torque wrench device). In another embodiment, assembly validation program 112 utilizes a library of specific products, where each specific product includes a set of activation events and alteration in settings for each IoT device utilized to assembled or disassemble the specific product. For an augmented reality device associated with user, assembly validation program 112 identifies a current step in the assembly or disassembly process based on a video received from a camera on the augmented reality device. Assembly validation program 112 receives the video feed from the camera on the augmented reality device and compares the actions of the user to a set of actions associated with an assembly or disassembly process for each specific product stored in a library.

Assembly validation program 112 displays appropriate positioning and alignment for the current step in the assembly or disassembly process (314). In one embodiment, assembly validation program 112 displays appropriate positioning and alignment for the current step in the assembly or disassembly process on the wearable device associated with user. Assembly validation program 112 can display directional arrows and/or commands for required positioning and one or more motions of the wearable device to perform the current step in the assembly or disassembly process. In another embodiment, assembly validation program 112 displays appropriate positioning and alignment for the current step in the assembly or disassembly process on the augmented device associated with user. Assembly validation program 112 can display instructions (e.g., 25 clockwise turns via the drill device) and tools settings (e.g., highest torque setting for the drill device) to perform the current step in the assembly or disassembly process. In yet another embodiment, assembly validation program 112 sets one or more settings on the IoT device (e.g., 100 ft-lbs. and counterclockwise for reverse thread setting on a torque wrench device) for the user to perform the current step in the assembly or disassembly process. Furthermore, if the IoT device includes a display, assembly validation program 112 displays appropriate positioning and alignment for the current step in the assembly or disassembly process on the IoT device to the user.

Assembly validation program 112 monitors actions of the user while performing the current step (316). Assembly validation program 112 monitors actions of the user while performing the current step by receiving a feed of data from the wearable device, the IoT device, and/or the augment reality device, associated with the user. The feed of data can include one or more motions from the wearable device, an activation event by the IoT device, an alteration in settings of the IoT device, a video stream from the augmented reality device, and any other data for monitoring an action performable by the user during an assembly or disassembly process. Assembly validation program 112 monitors the actions of the user and compares each action to the appropriate positioning and alignment for the current step in the assembly or disassembly process. For a wearable device, assembly validation program 112 compares a current motion of the wearable device to the set of motions of the wearable device for assembly or disassembly of the specific product. For an IoT device, assembly validation program 112 compares a current activation event or alteration in settings to the set of activation events and alteration in settings for the IoT device being utilized for assembly or disassembly of the specific product. For an augmented reality device, assembly validation program 112 compares a current video feed from the camera on the augmented reality device of an action performed by the user to a set of actions associated with an assembly or disassembly process for each specific product stored in the library.

Assembly validation program 112 determines whether corrective action is needed (decision 318). Assembly validation program 112 determines whether corrective action is needed by comparing a current action being performed by a user to one or more actions associated with the current step in the assembly or disassembly process. Furthermore, assembly validation program 112 can identify potential dangerous and/or damaging situations if the current action is not being performed correctly for the current step in the assembly or disassembly process and determine whether corrective action is needed. In the event assembly validation program 112 determines that corrective action is not needed ("no" branch, decision 318), assembly validation program 112 reverts to monitoring actions of the user while preforming the current step (316). In the event assembly validation program 112 determines that corrective action is needed ("yes" branch, decision 318), assembly validation program 112 determines a recommendation based on the corrective action needed (320).

In one embodiment, assembly validation program 112 determines a corrective action is needed based on data received from a wearable device associated with the user indicating that a torquing procedure was not followed while fastening a bolt based on a set of motions for the wearable device while assembling a specific product. For example, assembly validation program 112 received data from the wearable device while monitoring actions of the user and determines that based on a sharp jolt captured by the wearable device indicates the activation of a torque wrench. However, assembly validation program 112 did not receive data from the wearable device indicating that an additional action of rotating the torque wrench an additional 45 degree was performed. Therefore, assembly validation program 112 determines a corrective action is needed, where the corrective action includes the user performing the additional 45 degree turn to match the torquing procedures. In another embodiment, assembly validation program 112 determines a corrective action is needed based on data received from an IoT device (e.g., torque wrench device) associated with the user, where a torque setting of the IoT device does not match a torque setting required for fastening a bolt based on a set of activation event and alteration in setting for the IoT device while assembling a specific product. Assembly validation program 112 determines a corrective action is needed, where the corrective action includes altering a torque setting of the IoT device to match the set of activation events and alteration in settings for the IoT while assembling the specific product.

Assembly validation program 112 determines a recommendation based on the corrective action needed (320). Assembly validation program 112 determines the recommendation based on the corrective action needed and includes additional information for context regarding the corrective action. In one embodiment, assembly validation program 112 determines a corrective action is needed due to a user not performing an additional 45 degree turn to match torquing procedures. Assembly validation program 112 determines a recommendation specifying that a corrective action of performing the additional 45 degree turn is required based on torquing procedures and that the 45 degree turn was not captured by a wearable device associated with the user, which provides the context to the user regarding how assembly validation program 112 determined the corrective action was needed. The context allows the user to override the recommendation if the user determines that the specified corrective action was already performed but not captured by the wearable device (e.g., performed with an alternative hand that does not include the wearable device). In another embodiment, assembly validation program 112 determines a corrective action of torquing to a correct torque value (e.g., 100 ft-lbs. vs 70 ft-lbs.) is required. Assembly validation program 112 determines a recommendation specifying that a correcting action of a correct torque value of 100 ft-lbs. is required, since the torque wrench device (i.e., IoT device) was improperly set to 70 ft-lbs. The context of the torque wrench device being improperly set to 70 ft-lbs. allows for the user to rapidly identify why assembly validation program 112 is providing a recommendation with the corrective action.

Assembly validation program 112 displays the recommendation to the user (322). Assembly validation program 112 has the ability to display the recommendation to the user via a wearable device, an IoT device, and/or an augmented reality device, associated with the user. In one embodiment, assembly validation program 112 provides haptic feedback (e.g., a constant vibration) to indicate a corrective action is needed, where assembly validation program 112 displays the recommendation to the user on the wearable device associated with the user. In another embodiment, assembly validation program 112 temporarily disables an IoT device from performing any actions (e.g., drilling, torquing) until assembly validation program 112 receives confirmation that a recommendation displayed to the user on a wearable device has been viewed. The confirmation can include the wearable device being rotated to view a user interface displaying the recommendation and/or a selectable confirmation in the user interface that the recommendation was viewed by the user of the wearable device. As discussed above, context that assembly validation program 112 provides with the recommendation allows for the user to proceed with the corrective action or ignore the corrective action, if the user deems that the corrective action has already been performed.

In additional embodiments, each machine part of a specific product is uniquely identified, where the additional embodiments track a specification of each machine part of the specific product. The specification of each machine part of the specific product can include a number of threads (e.g., 25 threads), a thread length (e.g., one inch), and a number of threads inserted for fastening (e.g., 22 of the 25 threads to account for a washer). The additional embodiments identify the specification of each tool utilized during an assembly or disassembly operation with regards to the specific product. Each tool is IoT enabled (i.e., an IoT device) and provides various operational data with regards to the assembly or disassembly operations of the specific product. For every specific product, each machine part is uniquely identified and includes a specification detailing the assembling and disassembling parameters. A wearable device associated with the user performing the assembly or disassembly includes a movement and angular displacement detection sensor (e.g., accelerometer) to detect if a hand is rotating, a type of rotating (e.g., clockwise or counterclockwise), and a duration of rotating (e.g., 20 seconds). The wearable device can include a proximity detection sensor to identify which machine part is to be utilized for a specific step in the assembly or disassembly process. During the assembly or disassembly process, the additional embodiments identify which machine part is being fastened or unfastened, along with one or more tools being utilized to perform the fastening or unfastening.

The additional embodiments analyze a feed from a wearable device, an IoT device, and/or an augmented reality device associated with the user to identify how each machine part is fastening or unfastened. The additional embodiments can incorporate a thread matching system during the assembly or disassembly process and can determine if there are any conditions leading to potential thread damage due to improper and/or forceful fastening or unfastening (e.g., hammer versus rotating). The additional embodiments can notify with recommended steps (e.g., alter an angle of fastening, alter a bolt, or re-thread a mounting surface on the specific product and utilizing the augmented reality device, provide recommendations for appropriate parts based on the match criterion from the specification for the specific product. The additional embodiments can display an augmented blueprint depicting the appropriate positioning and/or angular alignment of the machine part on the specific product.

The additional embodiments can compare the expected versus actual speed of rotation and/or movement of a hand during assembly or disassembly operations and predict if proper fastening or unfastening is being performed. The additional embodiments can detect whether the machine part is faulty, where there is a condition of the machine part being bent or thread being damaged. An alert can be sent to the user via the wearable device to stop the fastening or unfastening operation and to invert the fastening or unfastening process to prevent further damage. Based on a torque, angular placement, and force exerted on the machine part, the additional embodiments can detect whether the fastener has developed a brushing or slippage condition on the bolt, screw, or groove of the machine part. An alert can be sent to the user via the wearable device to prevent, pause, or stop the process to prevent further damage.

Figure 4:
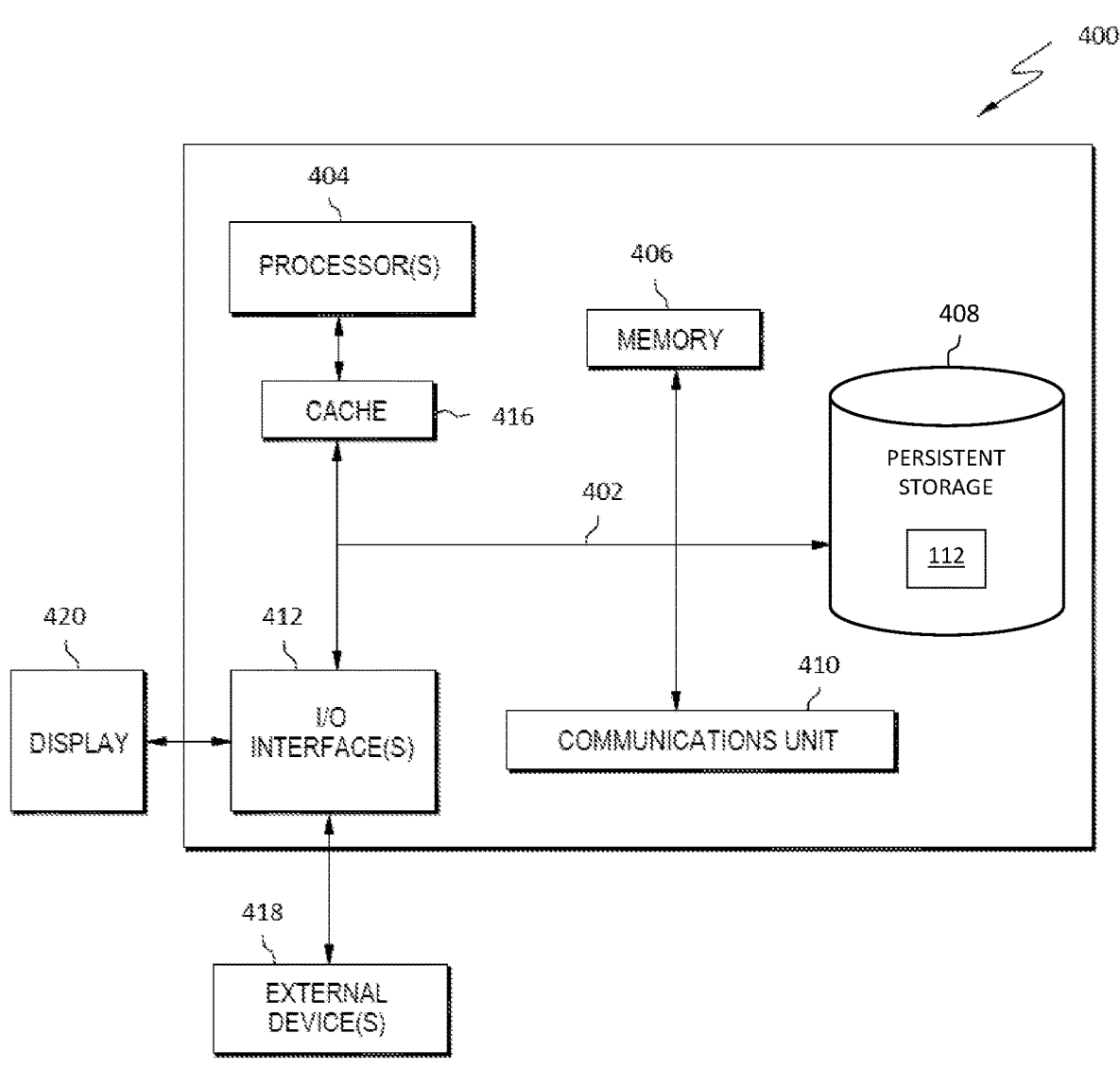
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes assembly validation program 112. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface (s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
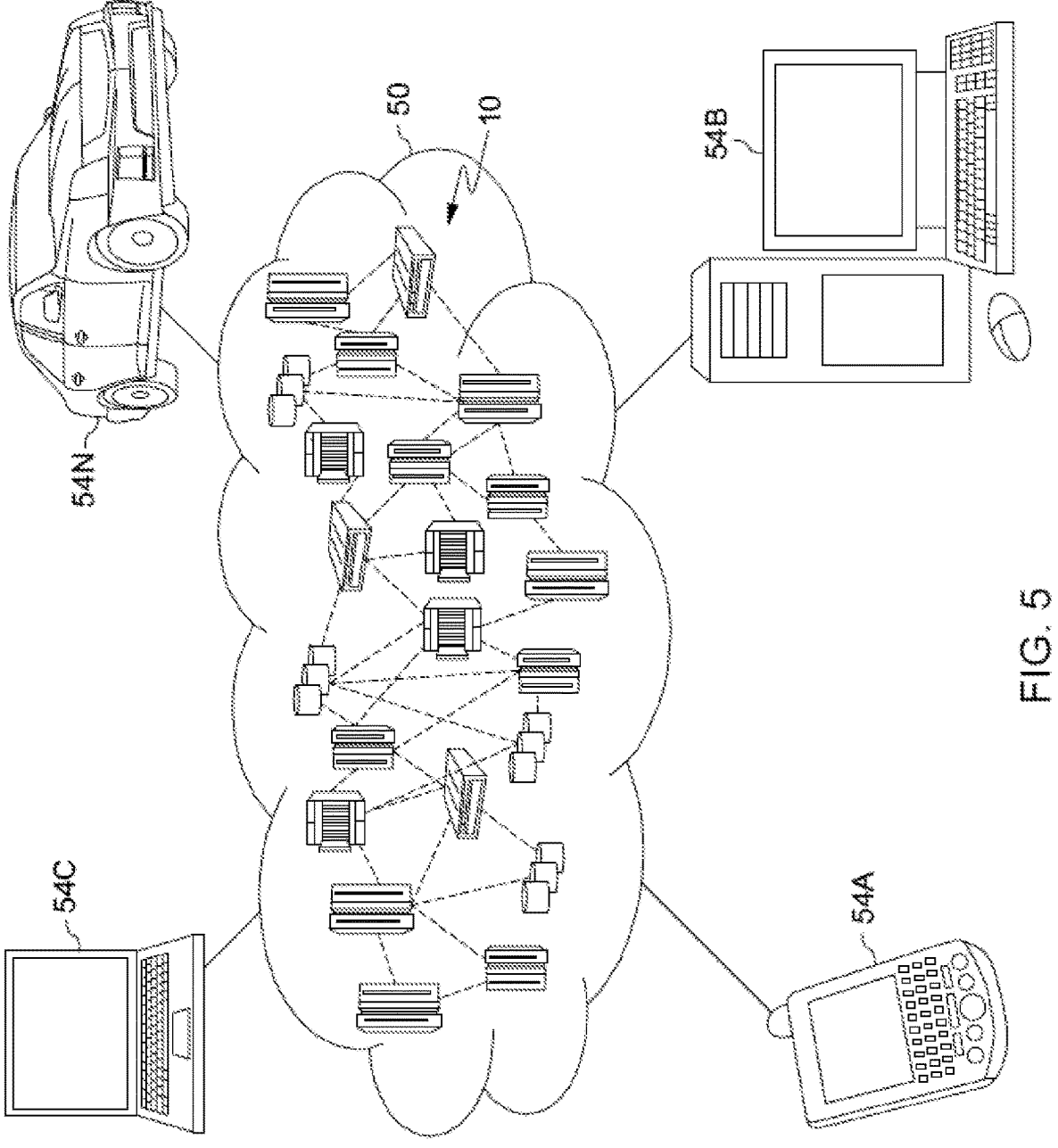
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
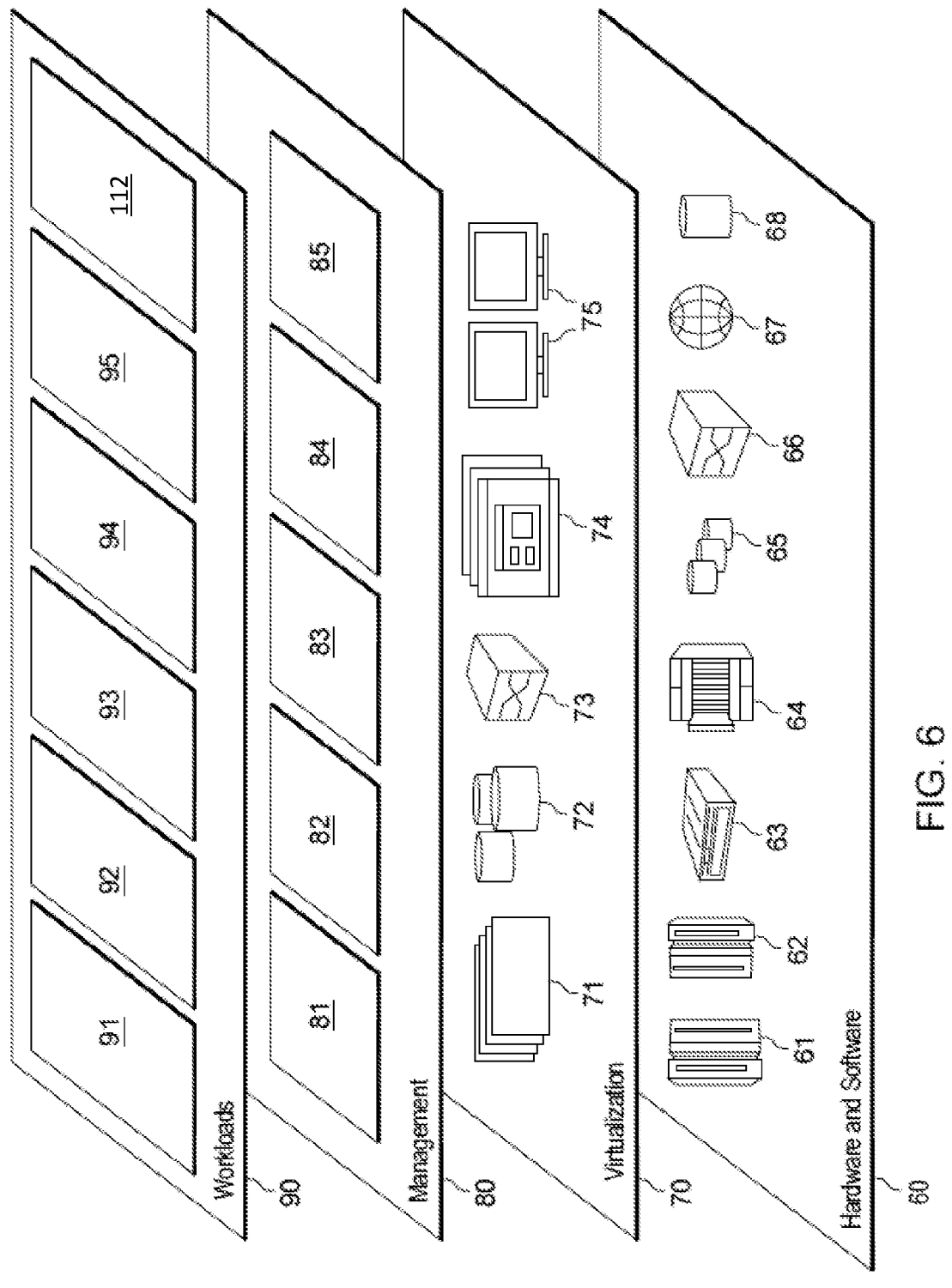
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assembly validation program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
monitoring a plurality of motions of a wearable device associated with a user for a plurality of assembly processes of a product;
determining, based on iterative machine learning, a set of motions for an assembly process of the product from the plurality of assembly processes of the product;

identifying a current step in the assembly process of the product;
monitoring an action of the user while performing the current step in the assembly process of the product, wherein the monitoring includes:
receiving a feed of data from the wearable device associated with the user, wherein the feed of the data includes one or more motions from the wearable device; and
comparing, for the current step, the one or more motions from the wearable device to the set of motions of the wearable device in the assembly process of the product;
determining, based on the comparing, a corrective action is required for the current step, wherein the corrective action includes performing an additional motion with at least one tool; and
disabling the at least one tool from performing any action.

2. The method of claim 1, further comprising:
identifying a plurality of individual parts for the assembly process of the product based on a specification of the product;
identifying a plurality of tools for the assembly process of the product based on the specification of the product, wherein the plurality of tools includes the at least one tool;
identifying one or more potential issues during the assembly process of the product; and
displaying the one or more potential issues during the assembly process of the product based on the plurality of individual parts and the plurality of tools.

3. The method of claim 1, further comprising:
receiving another feed of data from the at least one tool, wherein the another feed of the data from the at least one tool includes an alteration in setting for the at least one tool;
comparing the another feed of the data from the at least one tool to a set of activation events and alteration in settings for the at least one tool during the current step in the assembly process of the product; and
determining, based on the comparing of the another feed of the data from the at least one tool to the set of activation events and alteration in settings, another corrective action is required, wherein the another corrective action includes altering a torque setting on the at least one tool.

4. The method of claim 1, wherein the set of motions of the wearable device represent directional movements of the wearable device during a fastening or an unfastening of a plurality of individual parts.

5. The method of claim 1, further comprising:
determining a recommendation based on the corrective action;
displaying the recommendation to the user; and
determining at least one individual part is faulty, wherein the recommendation includes an alert displayed in the wearable device associated with the user to invert a first motion from the one or more motions.

6. The method of claim 1, further comprising:
providing, via the wearable device, a haptic feedback indicating to the user the corrective action is required for the current step.

7. The method of claim 1, further comprising:
detecting, based on a torque, angular placement and force exerted on a machine part during the assembly process of the product, a slippage condition for the machine part; and altering the user to cease a fastening or unfastening process during the assembly process of the product.

8. The method of claim 1, further comprising:
comparing a number of rotations during fastening or unfastening of a machine part with a specification for the machine part, wherein the specification includes a number of threads for the machine part; and
predicting, based on the comparing the number of rotations during the fastening or the unfastening of the machine part with the specification for the machine part, a slippage condition for the machine part.

9. The method of claim 8, wherein the specification further includes a thread length and a portion of the number of threads inserted for fastening.

10. The method of claim 1, further comprises:
receiving, via an augmented reality device associated with the user, a video feed;
identifying, based on the video feed, the product; and
determining the product is being assembled.

11. The method of claim 1, wherein the identifying the current step in the assembly process of the product is based on a pattern of hand motions being performed by the user.

12. A computer program product comprising:
one or more computer readable storage media; and
program instructions stored on the one or more computer readable storage media to perform operations comprising:
monitoring a plurality of motions of a wearable device associated with a user for a plurality of assembly processes of a product;
determining, based on iterative machine learning, a set of motions for an assembly process of the product from the plurality of assembly processes of the product;
identifying a current step in the assembly process of the product;
monitoring an action of the user while performing the current step in the assembly process of the product, wherein the monitoring includes:
receiving a feed of data from the wearable device associated with the user, wherein the feed of the data includes one or more motions from the wearable device; and
comparing, for the current step, the one or more motions from the wearable device to the set of motions of the wearable device in the assembly process of the product;
determining, based on the comparing, a corrective action is required for the current step, wherein the corrective action includes performing an additional motion with at least one tool; and
disabling the at least one tool from performing any action.

13. The computer program product of claim 12, wherein the operations further comprise:
identifying a plurality of individual parts for the assembly process of the product based on a specification of the product;
identifying a plurality of tools for the assembly process of the product based on the specification of the product, wherein the plurality of tools includes the at least one tool;
identifying one or more potential issues during the assembly process of the product; and
displaying the one or more potential issues during the assembly process of the product based on the plurality of individual parts and the plurality of tools.

14. The computer program product of claim 13, wherein the operations further comprise:
receiving another feed of data from the at least one tool, wherein the another feed of the data from the at least one tool includes an alteration in setting for the at least one tool;
comparing the another feed of the data from the at least one tool to a set of activation events and alteration in settings for the at least one tool during the current step in the assembly process of the product; and
determining, based on the comparing of the another feed of the data from the at least one tool to the set of activation events and alteration in settings, another corrective action is required, wherein the another corrective action includes altering a torque setting on the at least one tool.

15. The computer program product of claim 12, wherein the set of motions of the wearable device represent directional movements of the wearable device during a fastening or an unfastening of a plurality of individual parts.

16. The computer program product of claim 12, wherein the operations further comprise:
determining a recommendation based on the corrective action; and
displaying the recommendation to the user.

17. A computer system comprising:
a processor set;
one or more computer readable storage media; and
program instructions stored on the one or more computer readable storage media to cause the processor set to perform operations comprising:
monitoring a plurality of motions of a wearable device associated with a user for a plurality of assembly processes of a product;
determining, based on iterative machine learning, a set of motions for an assembly process of the product from the plurality of assembly processes of the product;
identifying a current step in the assembly process of the product;
monitoring an action of the user while performing the current step in the assembly process of the product, wherein the monitoring includes:
receiving a feed of data from the wearable device associated with the user, wherein the feed of the data includes one or more motions from the wearable device; and
comparing, for the current step, the one or more motions from the wearable device to the set of motions of the wearable device in the assembly process of the product;
determining, based on the comparing, a corrective action is required for the current step, wherein the corrective action includes performing an additional motion with at least one tool; and
disabling the at least one tool from performing any action.

18. The computer system of claim 17, wherein the operations further comprise:
identifying a plurality of individual parts for the assembly process of the product based on a specification of the product;
identifying a plurality of tools for the assembly process of the product based on the specification of the product, wherein the plurality of tools includes the at least one tool;

identifying one or more potential issues during the assembly process of the product; and displaying the one or more potential issues during the assembly process of the product based on the plurality of individual parts and the plurality of tools.

19. The computer system of claim 18, wherein the operations further comprise:

receiving another feed of data from the at least one tool, wherein the another feed of the data from the at least one tool includes an alteration in setting for the at least one tool;

comparing the another feed of the data from the at least one tool to a set of activation events and alteration in settings for the at least one tool during the current step in the assembly process of the product; and determining, based on the comparing of the another feed of the data from the at least one tool to the set of activation events and alteration in settings, another corrective action is required, wherein the another corrective action includes altering a torque setting on the at least one tool.

20. The computer system of claim 17, wherein the set of motions of the wearable device represent directional movements of the wearable device during a fastening or an unfastening of a plurality of individual parts.

\* \* \* \* \*